No. 778,669.　　　　　　　　　　　　　　　　　Patented December 27, 1904.

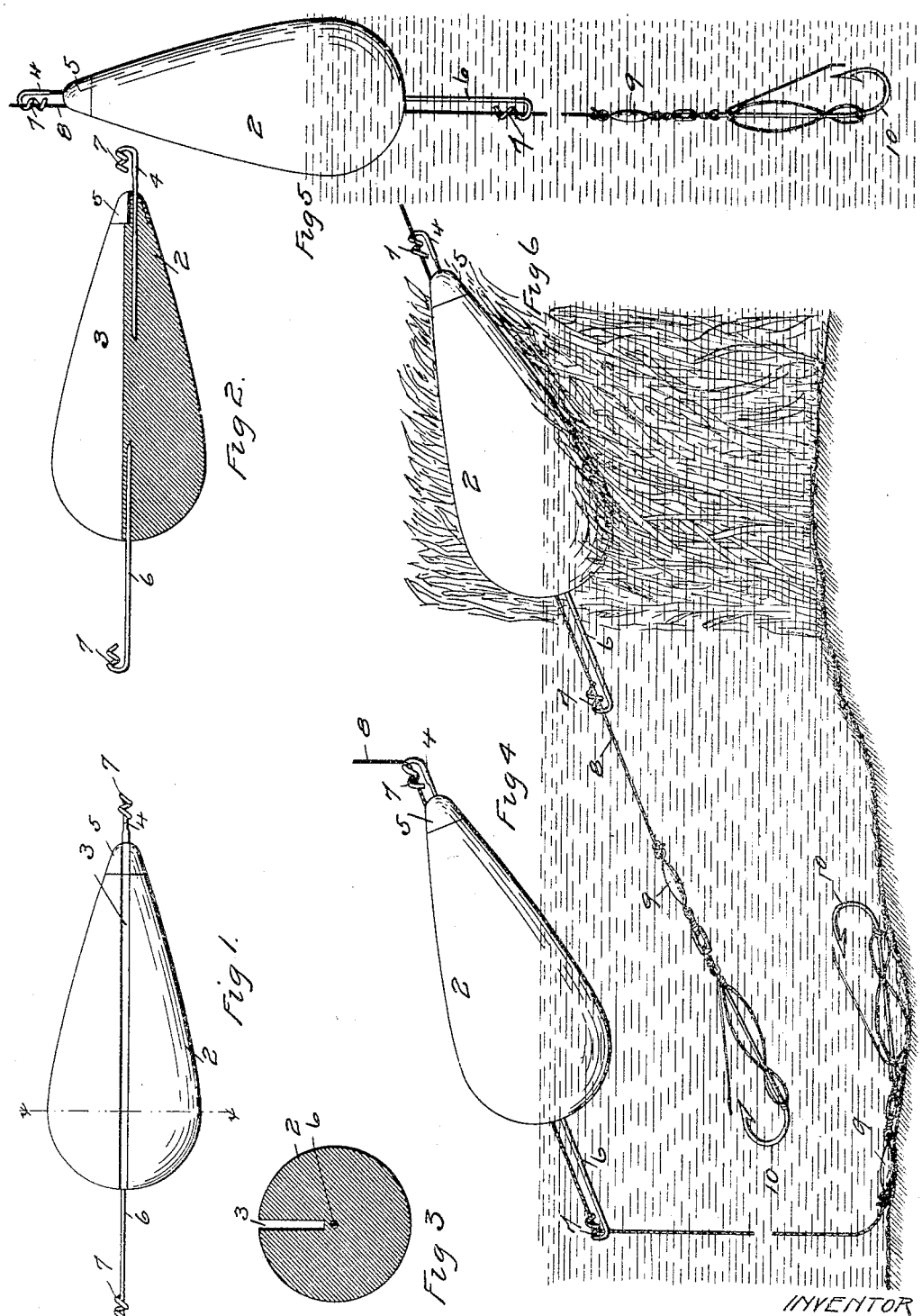

UNITED STATES PATENT OFFICE.

WILLIAM H. JACOBY, OF MINNEAPOLIS, MINNESOTA.

FISH-LINE FLOAT.

SPECIFICATION forming part of Letters Patent No. 778,669, dated December 27, 1904.

Application filed February 19, 1903. Serial No. 144,025.

*To all whom it may concern:*

Be it known that I, WILLIAM H. JACOBY, of Minneapolis, county of Hennepin, State of Minnesota, have invented certain new and useful Improvements in Fish-Line Floats, of which the following is a specification.

My invention relates to floats or bobs adapted to be attached to a fish-line between the sinker and the reel and to float on the surface of the water and support the bait the desired distance above the bottom and by moving up and down indicate to the fisherman when the fish is nibbling or has taken the bait.

The invention consists generally in providing a float having a longitudinal slot to receive the line, rendering it unnecessary to remove the hook and sinker or detach the line from the reel when it is desired to put the float thereon.

Further, the invention consists in providing pins in the ends of the float having spiral coils in their outer ends.

Further, the invention consists in providing a pin-tube or equivalent device in the lower end of the float that extends for a considerable distance below the float.

Further, the invention consists in various constructions and combinations, all as hereinafter described, and particularly pointed out in the claims.

In the accompanying drawings, forming part of this specification, Figure 1 is a plan view of a float embodying my invention. Fig. 2 is a longitudinal section of the same. Fig. 3 is a transverse section on the line *x x* of Fig. 1. Fig. 4 is a view illustrating the position assumed by the float on the surface of the water when the hook and sinker are resting upon the bottom. Fig. 5 illustrates the position assumed by the float on the surface of the water when the hook and sinker do not touch the bottom. Fig. 6 is a view illustrating the position assumed by the float when it is being dragged over weeds or other obstructions.

In the drawings, 2 represents the float, having a rounded lower end and tapering to a point at its upper end and made of light wood, cork, or any other suitable material. A slot 3 extends lengthwise through the float from end to end thereof and preferably of sufficient depth to intersect the longitudinal axis of the float. A pin 4 is provided at the upper end of the float near the slot therein, and said upper end is preferably protected and strengthened by a metallic cap 5. A similar pin 6 is provided in the lower end of the float and extends for a considerable distance below the same, and each pin is provided at its outer end with a spiral coil 7, forming an eye or loop through which the line 8 is passed. The coils 7 are spaced sufficiently from the shanks of the pins to allow the line to be threaded therethrough or disconnected therefrom without removing the sinker 9 or the hook 10 or detaching the line from the reel. The portion of the line between the pins will slip into the slot 3 until it is substantially parallel with the pin-checks and will slide freely through the eyes or loops 7. The weight of the sinker and bait will therefore exert a direct pull on the float and cause it to assume a substantially perpendicular position in the water. The distance of the loop on the pin 6 from the lower end of the float will increase the leverage of the sinker and bait on the float sufficiently to insure the float assuming a vertical position in water where the hook and sinker do not touch the bottom, and in casting the fisherman can easily determine whether the hook is on the bottom or not by the position of the float. In preparing to cast, the float will slide down against the sinker, and when the hook and bait strike the water the float will slide up the line and remain on the surface. If preferred, a loop may be made in the line around either one of the pins to prevent the float from changing its position.

In drawing in the line after casting into weeds the float will assume the position shown in Fig. 6, the top or upper end pointing upward and the main portion of the float lying at an incline and slipping easily through or over the weeds.

I claim as my invention—

1. A fish-line float, comprising a tapered bulb or body 2, having a longitudinal slot 3 and the pins 4 and 6 provided in the ends of said float, and having inwardly-turned spirally-coiled outer ends, for the purpose specified.

2. A fish-line float, comprising a part 2 having a longitudinal slot 3, pins 4 and 6, provided in the ends of said part 2 near said slot, and inwardly-turned spiral coils 7 provided on the outer ends of said pins and spaced from the shank portion thereof, for the purpose specified.

In witness whereof I have hereunto set my hand this 14th day of February, 1903.

WILLIAM H. JACOBY.

In presence of—
RICHARD PAUL,
C. G. HANSON.